(12) United States Patent
Perentes et al.

(10) Patent No.: US 11,259,557 B2
(45) Date of Patent: Mar. 1, 2022

(54) ROASTING AND GRINDING SYSTEM AND METHOD

(71) Applicant: NESTEC S.A., Vevey (CH)

(72) Inventors: Alexandre Perentes, Sullens (CH); Flavien Dubief, Champagne (CH); Alfred Yoakim, St-Legier-la Chiesaz (CH); Christianne Bournival, Orbe (CH)

(73) Assignee: Societe des Produits Nestle S.A., Vevey (CH)

( * ) Notice: Subject to any disclaimer, the term of this patent is extended or adjusted under 35 U.S.C. 154(b) by 188 days.

(21) Appl. No.: 16/092,508

(22) PCT Filed: Apr. 10, 2017

(86) PCT No.: PCT/EP2017/058476
§ 371 (c)(1),
(2) Date: Oct. 10, 2018

(87) PCT Pub. No.: WO2017/178393
PCT Pub. Date: Oct. 19, 2017

(65) Prior Publication Data
US 2019/0166899 A1 Jun. 6, 2019

(30) Foreign Application Priority Data
Apr. 13, 2016 (EP) ..................... 16165166

(51) Int. Cl.
*A23N 12/08* (2006.01)
*A47J 31/42* (2006.01)
(Continued)

(52) U.S. Cl.
CPC .............. *A23N 12/083* (2013.01); *A23F 5/04* (2013.01); *A23F 5/08* (2013.01); *A23N 12/125* (2013.01); *A47J 31/42* (2013.01)

(58) Field of Classification Search
CPC ....... A23N 12/083; A23N 12/125; A23F 5/04; A23F 5/08; A47J 31/42
See application file for complete search history.

(56) References Cited

U.S. PATENT DOCUMENTS 2,026,697 A * 1/1936 Musher .................... A23B 7/16
426/102
3,153,377 A 10/1964 Bosak
(Continued)

FOREIGN PATENT DOCUMENTS

| CN | 1416321 A | 5/2003 |
| CN | 1931068 A | 3/2007 |

(Continued)

OTHER PUBLICATIONS

English Translation for J PH01285223 published Nov. 1989.*
(Continued)

*Primary Examiner* — Anthony J Weier
(74) *Attorney, Agent, or Firm* — K&L Gates LLP

(57) ABSTRACT

A roasting and grinding system (100) for preparing and delivering on demand roast and ground coffee, the system having: one or more raw containers (10, 10', 10", etc.) having green coffee beans of the same or of different types; a roasting unit (20) receiving green coffee beans from one or more of the raw containers (10, 10', 10", etc.) at the time, the roasting unit (20) adapting automatically the roasting parameters to the type of green coffee beans to roast; a conservation area (30) where the roasted coffee is stored at appropriate atmosphere until it is grinded; a grinding area (40) having one or more grinding units (41, 41', 41", etc.) one per type of coffee to be ground, adapting automatically the grinding parameters to the type of coffee or coffee mix to be ground. The invention further relates to a raw container (10, 10', 10", etc.) having green coffee beans detachably con- (Continued)

nectable to a roasting and grinding system (100), and to a method for roasting and grinding coffee blends on demand using such a system.

19 Claims, 3 Drawing Sheets

(51) Int. Cl.
*A23N 12/12* (2006.01)
*A23F 5/04* (2006.01)
*A23F 5/08* (2006.01)

(56) References Cited

U.S. PATENT DOCUMENTS

| | | | | |
|---|---|---|---|---|
| 3,964,175 | A * | 6/1976 | Sivetz | A23F 5/046 34/589 |
| 4,484,064 | A * | 11/1984 | Murray | A47J 42/52 219/400 |
| 4,895,308 | A | 1/1990 | Tanaka | |
| 5,076,157 | A * | 12/1991 | Satake | A23F 5/02 99/519 |
| 5,083,502 | A * | 1/1992 | Enomoto | A47J 31/42 241/65 |
| 5,267,507 | A | 12/1993 | Enomoto | |
| 5,368,875 | A * | 11/1994 | Hibi | A23F 5/04 426/466 |
| 5,500,237 | A * | 3/1996 | Gell, Jr | A23F 5/046 34/360 |
| 6,339,985 | B1 * | 1/2002 | Whitney | A47J 31/061 99/286 |
| 8,067,049 | B2 * | 11/2011 | Hibi | A23F 5/105 426/316 |
| 2009/0098264 | A1 * | 4/2009 | Krebs | A23F 5/04 426/466 |
| 2012/0015094 | A1 * | 1/2012 | Young | A23F 5/14 426/595 |
| 2014/0076167 | A1 * | 3/2014 | Boggavarapu | A47J 31/42 99/286 |
| 2016/0338525 | A1 * | 11/2016 | Fain | A47J 31/002 |
| 2016/0374504 | A1 * | 12/2016 | Hoon | A47J 31/42 426/231 |
| 2019/0231146 | A1 * | 8/2019 | Dubief | A47J 42/52 |

FOREIGN PATENT DOCUMENTS

| | | | |
|---|---|---|---|
| CN | 101128142 | A | 2/2008 |
| CN | 102084225 | A | 6/2011 |
| CN | 203425778 | U | 2/2014 |
| CN | 203736014 | U | 7/2014 |
| GB | 2485073 | | 5/2012 |
| GB | 2530680 | | 3/2016 |
| JP | H01285223 | * | 11/1989 |
| JP | H07311878 | * | 11/1995 |
| JP | H1166419 | * | 3/1999 |
| WO | 03062101 | | 7/2003 |
| WO | WO2011/000926 | * | 1/2011 |
| WO | 2014043652 | | 3/2014 |
| WO | 2016041794 | | 3/2016 |

OTHER PUBLICATIONS

English Translation for JPH07311878 published Nov. 1995.*
English Translation for JPH1166419 published Mar. 1999.*
Home Roasting 101.2014. https://caravancoffee.com/blogs/news/home-roasting-101.*
Food Safety. 2013. https://www.food-safety.com/articles/4032-a-close-look-at-coffee-safety-shelf-life-from-bean-to-cup.*
Chinese Office Action for Appl No. 20178002111.2 dated May 8, 2021

* cited by examiner

ROASTING AND GRINDING SYSTEM AND METHOD

CROSS REFERENCE TO RELATED APPLICATIONS

The present application is a National Stage of International Application No. PCT/EP2017/058476, filed on Apr. 10, 2017, which claims priority to European Patent Application No. 16165166.6, filed on Apr. 13, 2016, the entire contents of which are being incorporated herein by reference.

FIELD OF THE INVENTION

The present invention relates to roasting and grinding system for preparing and delivering on demand roast and ground coffee, departing from green coffee beans. Moreover, the invention relates to a container comprising green coffee beans and connectable to such a system. Furthermore, the invention relates to a method for preparing roast and ground coffee blends using this system.

BACKGROUND OF THE INVENTION

When making coffee, present consumers demand more and more the use of coffee beans that have been freshly roasted and possibly also freshly grinded. Currently available home roasters and home grinders usually pre-set the parameters of the roasting and of the grinding process, therefore adjusting roasting and/or grinding parameters is not a possibility offered to consumers. When this possibility is offered, it happens that the preparation time of the roast and ground coffee, when a good blend is prepared, is too long and also the consumer, when adjusting the parameters for the roasting and grinding, does not set correct parameters, resulting in a low quality final blend, not satisfactory.

For example, document GB 860894 is known in the state of the art, disclosing a method and a machine for automatically producing coffee extract from green coffee beans, roasting individual rations of coffee beans which are later grinded, such that the ground coffee is extracted for producing individual small rations or cups of a coffee extract from each individual ration of coffee beans. In this document, the roasting, grinding and extracting operations are individually and successively executed for each ration of coffee. However, this system does not allow producing different blends of coffee by mixing different coffee types for example, neither discloses a full automated system allowing to produce said different blends on demand.

Another example in the prior art comes from document U.S. Pat. No. 5,267,507, disclosing a coffee maker capable of providing freshly brewed coffee from raw coffee beans through a process of roasting, grinding, and brewing the coffee. This coffee maker includes a roaster which roasts raw coffee beans, cooling means for cooling the coffee beans roasted by the roaster, grinding means for grinding the beans and supplying the ground coffee, and heating and water supply means which heats and supplies the water from a water tank. However, this system does not allow producing different blends of coffee by mixing different coffee types, neither discloses a full automated system allowing to produce said different blends on demand.

Further, prior art document WO 2010033023 discloses a system for preparing a coffee beverage including a coffee making apparatus comprising a grinder for grinding coffee beans to obtain ground coffee, a coffee beverage preparation device arranged for, with supply of water to the ground coffee, preparing the coffee beverage, and a coffee outlet for dispensing the coffee beverage. However, such a system does not disclose any roasting unit or device able to provide roasting of the coffee beans which need to be provided already roasted.

Another example in the state of the art comes from document U.S. Pat. No. 5,564,331, disclosing an apparatus for roasting raw coffee beans by means of a heated airstream for a predetermined period of time, and then to apply a cooling airstream at the end of the roasting process. However, such a system does not disclose any grinding unit nor does it present a complete system able to prepare and provide different coffee blends on demand.

Therefore, from the above, it follows that there is a need for a system able to provide roast and ground coffee departing from raw coffee beans, in an automatic, easy and convenient way, solving the drawbacks in the state of the art. The present invention is oriented towards these needs.

SUMMARY OF THE INVENTION

According to a first aspect, the invention relates to a roasting and grinding system for preparing and delivering on demand roast and ground coffee, the system comprising:
  one or more raw containers comprising green coffee beans of the same or of different types;
  a roasting unit receiving green coffee beans from one or more of the raw containers at the time, the roasting unit adapting automatically the roasting parameters to the type of green coffee beans to roast;
  a conservation area where the roasted coffee is stored at appropriate atmosphere until it is grinded;
  a grinding area comprising one or more grinding units one per type of coffee to be grinded, adapting automatically the grinding parameters to the type of coffee or coffee mix to be grinded.

Typically, the conservation area comprises one or more conservation containers corresponding to the one or more raw containers. The grinding area can comprise one or more grinding units one per type of coffee to be grinded, corresponding to the one or more conservation containers.

According to another embodiment, the conservation area is configured in the raw containers.

Preferably, the roasting and grinding system further comprises a mixing area where the grinded coffee is mixed depending on the blend or recipe desired. Typically, each raw container comprises single origin or blends of green coffee beans.

In the roasting and grinding system of the invention, the roasting parameters are preferably one or a combination of: air temperature, bean temperature, time, coffee weight, humidity, pressure, gas emissions, color detection, etc. The grinding parameters are preferably one or a combination of: grinding size, grinding time, etc.

In the system of the invention, the conservation area typically stores and preserves roasted coffee in a controlled protective atmosphere (vacuum, temperature, humidity, inert, $N_2$, UV protection, etc.).

The roasting and grinding system of the invention preferably further comprises a crushing unit where the green coffee beans coming from the raw containers are reduced to a smaller size before they enter the roasting unit.

Preferably, the system comprises a polishing unit where the green coffee beans coming from the raw containers are cleaned before they enter the roasting unit.

The system can further comprise a dosing unit for supplying pre-determined dosages of green coffee beans from the raw containers into the roasting unit.

The system preferably comprises also control means to identify the content and/or configuration of the raw containers and adapt the roasting and the grinding parameters applied according to the type of coffee processed.

The roasting and grinding system of the invention typically further comprises a brewing unit to receive the roast and ground coffee.

According to a second aspect, the invention relates to a raw container comprising green coffee beans detachably connectable to a roasting and grinding system of the invention.

Preferably, the raw container comprises closing means which can adopt an open and a closed condition, such that in the open condition coffee beans are provided into the roasting unit and, in the closed condition, the exit of the raw containers is closed, and the raw container can be removed/detached from the roasting and grinding system.

Typically, the raw container further comprises coupling means allowing attaching and detaching of the raw container from the roasting and grinding system.

The raw container of the invention preferably further comprises identification means with information on the type of green coffee beans in it, connectable to control means when the raw container is plugged to the roasting and grinding system. The identification means typically comprise one or more roasting parameters of the type of coffee contained in it and/or one or more grinding parameters of the type of coffee contained in it.

According to a third aspect, the invention relates to a method for roasting and grinding coffee blends on demand using a system as the one described, the method comprising:
  delivering a predetermined quantity of green coffee beans from one or more raw containers at a time into the roasting unit;
  roasting separately each quantity of green coffee beans provided according to certain roasting parameters adapted to the type of coffee roasted;
  sending each quantity of roasted coffee per type of coffee to a conservation area where the roasted coffee is stored and preserved;
  once demanded and depending on the coffee blend requested, sending a predetermined quantity of roasted coffee from the conservation area to the grinding area, where it is grinded and is further sent to the mixing area;
  mixing one or more grinded coffee, in predetermined quantities, in order to obtain a desired coffee blend.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which.

DETAILED DESCRIPTION OF EXEMPLARY EMBODIMENTS

According to a first aspect, the invention relates to a roasting and grinding system able to prepare and deliver on demand roast and ground coffee, departing from green coffee beans.

Figure 1:
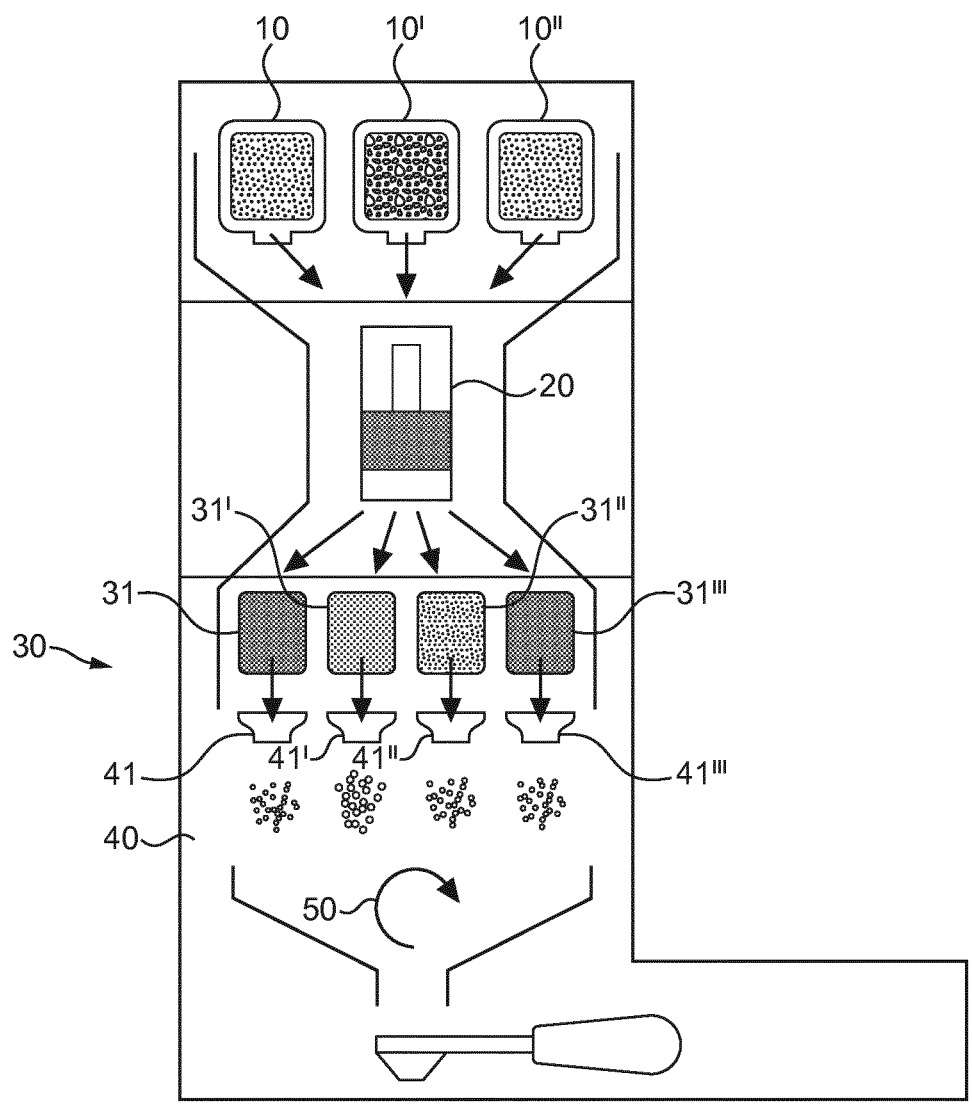
FIG. 1 shows a schematic view of a roasting and grinding system for preparing and delivering on demand roast and ground coffee, according to a first possible configuration according to the invention.

As schematically represented in a possible configuration, as the one shown in FIG. 1, the roasting and grinding system 100 comprises:
  one or several raw containers 10, 10', 10", etc. where green coffee beans of one or several types are stored;
  a roasting unit 20 receiving green coffee beans from one or more of the raw containers 10, 10', 10", etc. at the time, the roasting unit 20 adapting automatically the roasting parameters to the type of green coffee beans to roast;
  a conservation area 30 comprising one or more conservation containers 31, 31', 31", etc. corresponding to the one or more raw containers 10, 10', 10", etc., where the roasted coffee is stored at appropriate atmosphere until it is grinded;
  a grinding area 40 comprising one or more grinding units 41, 41', 41", etc. corresponding to the one or more conservation containers 31, 31', 31", etc., the grinding units 41, 41', 41", etc. adapting automatically the grinding parameters to the type of roasted coffee mixes coming from the conservation containers 31, 31', 31", etc.

Optionally, the roasting and grinding system 100 of the invention can comprise a mixing area 50 where the grinded coffee is mixed depending on the blend or recipe desired, before it is delivered or sent to a brewing unit where coffee beverage is prepared.

The system 100 of the invention is able to provide consistent and repeatable roasting and grinding of departing green coffee beans, fresh prepared just before the consumption to prepare fresh coffee of the highest quality. Some of the main advantages of the system are: high quality, freshness and high level of control over process repeatability. Moreover, different coffee blends can be prepared on demand, according to consumer's preferences. The system of the invention further requires very low control from the consumer side, and works in an automatic way, providing results of the highest quality and in a repeatable manner.

The system provides two main improvements with respect to systems known in the prior art:
  freshness: beans are roasted as close as possible to usage and are stored under inert conditions of correct preservation to maintain integrity of their flavor in the conservation area 30 (in conservation containers 31, 31', 31", etc.);
  flexibility: providing different options for the desired roasting and grinding, allowing the consumer to prepare the coffee desired, and adapting these parameters to the preferred brewing method and technique.

The system further roasts beans at the perfect roasting level according to the type of coffee beans roasted. Moreover, the grind size is also adapted to perfectly suit the type of coffee to be prepared (for example, filter coffee, expresso, etc.).

Preferably, the roasting process in the roasting unit 20 is performed using ambient and hot air having a high level of movement, further moving the beans, therefore providing a very effective method for transferring the heat to the beans. Two main functions are attained:

- roasting of the green beans with air at a preferred temperature ranging from 180° C. up to 240° C. is performed;
- movement of the beans is also achieved for obtaining uniform roasting with an air pressure above 1 bar.

The roasted beans expand in volume after the roasting process: therefore, the roasting unit 20 needs to be prepared to take into consideration this expansion. The material configuring the roasting unit therefore need to be resistant to the roasting temperature and consistent enough to the high air flow inside it. After the roasting process is finished, cooling takes place in the roasting unit 20, quickly in order to stop the roasting process when desired.

Even when not shown the system 100 of the invention may further comprise a brewing unit, able to brew coffee from the roast and ground coffee provided in the output of the system.

In the roasting unit 20, roasting is typically achieved by hot air inside the unit which roasts the beans, this air further moving the beans inside so the roasting is more effective and more homogenous. After roasting, cooling takes place typically in the roasting unit: cooling is achieved by either ambient air or $N_2$ being blown inside the roasting unit 20.

The raw containers 10, 10', 10'', etc. are connected typically to the system 100 of the invention in a quick way, of the bayonet, screw, press fit type, etc. These containers further comprise dosing means (not shown) to deliver part or all of their content to the roasting unit 20. These raw containers are also made in such a way that their content (coffee beans) can be stored up to 2 years under standard ambient conditions (not high humidity or extreme temperatures), also protecting their content from UV radiation.

The dosing unit can work dosages by gravity and time, or in a volumetric way, or through mass measurement, etc. The dosing unit can be comprised in the raw container (it can even be made disposable) or it can be provided in the system interacting with the containers. Air blowing convection, air-Ventilation, gravity, dosing screws, etc. can for example be used as dosing means from delivering coffee beans from the raw containers into the roasting unit 20.

In the roasting unit 20, the roasting of the coffee beans is done slowly, for 15 to 25 minutes preferably (Maillard reaction and reduction of chlorogenic acid needs certain time), under low temperature of 180 to 240° C. in order to obtain better results. After roasting, immediate cooling down to ambient temperature takes place, which is important to stop the roasting process: typical cooling time is from 2 to 4 minutes. Furthermore, in order to obtain the best results in flavor, typically from 12 hours to 7 days of time are needed after roasting: during this time, beans still lose carbon dioxide. Inside the conservation containers 31, 31', 31'' in the conservation area 30, the atmosphere needs to be controlled (vacuum, temperature, humidity, inert, $N_2$, UV protection) to protect the coffee beans against oxidation. The roasting unit 20 further typically comprise an air filter to prevent particles, smoke and smell from being expelled during and/or after the roasting process.

In the roasting unit 20, as a way of example, the predicted energy needed for roasting 1 Kg beans is given by:

$$Q = m \cdot c_p \cdot \Delta T = 525 \text{ kJ}$$

where
$\Delta T = 230° C. - 20° C. = 210° C.$
$c_p = 2.5 \text{ kJ}/° C./kg$
$m = 1 \text{ kg}$
525 kJ is the energy released in 20 minutes
437.5 J/s = 437.5 W heating power needed, when considering perfect absorption by the beans This indicates that 1 KW should be sufficient to achieve roasting within an acceptable time frame and without specialty electronics or different supply network.

In the roasting unit 20, the green beans expand typically by 170% to 200% of their original volume (sometimes even up to 300%) depending on the roasting process and movement needed. This requires that free space is kept inside the roasting unit: moreover, in order to have an even and uniform roasting, space is needed for the beans to move, so all their surfaces can be exposed to the heat source. As such, a roasting volume of 2 to 3 times greater than the transportation volume is needed typically.

In the grinding units 41, 41', 41'', etc. the previously roasted beans are broken along their natural structure, which sets the aromas free. Grain size of grinding is very important too, as it also influences the aromas and flavor obtained. For better results, coffee should be brewed as soon as possible after grinding, so coffee grounds can maintain their flavor.

The system of the invention can further comprise a crushing unit (not shown) where the green coffee beans coming from the raw containers 10, 10', 10'', etc. are reduced to a smaller size before they enter the roasting unit 20.

The system can further comprise a polishing unit where the green coffee beans coming from the raw containers 10, 10', 10'', etc. are cleaned (removing parches, other impurities) before they enter the roasting unit 20.

The system can optionally also comprise control means to identify the content and/or configuration of the raw containers 10, 10', 10'', etc. and adapt the roasting and the grinding parameters applied according to the type of coffee processed.

The raw containers 10, 10', 10'', etc. can further comprise closing means which can adopt an open and a closed condition, such that in the open condition coffee beans are provided into the roasting unit 20 and, in the closed condition, the exit of the raw containers 10, 10', 10'', etc. is closed, and the raw container can be removed/detached from the roasting and grinding system 100.

The raw containers 10, 10', 10'', etc. can further comprise identification means with information on the type of green coffee beans in it (freshness trackers, origins, harvest date, etc.), connectable to control means when the raw container is plugged to the roasting and grinding system 100. The identification means can comprise one or more roasting parameters of the type of coffee contained in it and/or one or more grinding parameters of the type of coffee contained in it.

The system of the invention is configured to be able to provide the correct coffee dose and with the correct grain size, on demand, and tailored according to the type of coffee needed.

Different possible configurations of the system 100 of the invention are possible and are presented in the Figures attached with the present application. FIG. 1 shows for example a configuration where several raw containers 10, 10', 10'' are provided, where the green coffee beans are stored; further, a unique roasting unit 20 is provided (different roasting is possible for each coffee bean type): green coffee beans from one or more of the raw containers 10, 10', 10'' are sent to the roasting unit 20: the beans are roasted and further sent to the conservation area 30, to different conservation containers 31, 31', 31", 31'" where the roasted coffee blend prepared is maintained under correct preservation atmosphere, under certain time, before it is grinded. Later, there is a grinding unit 41, 41', 41", 41'" per each one of the conservation containers 31, 31', 31", 31'" so each coffee blend is grinded separately, then being provided to the mixing area 50 from where it is delivered or sent to the brewing unit (not shown) for preparing the coffee beverage desired.

Figure 2:
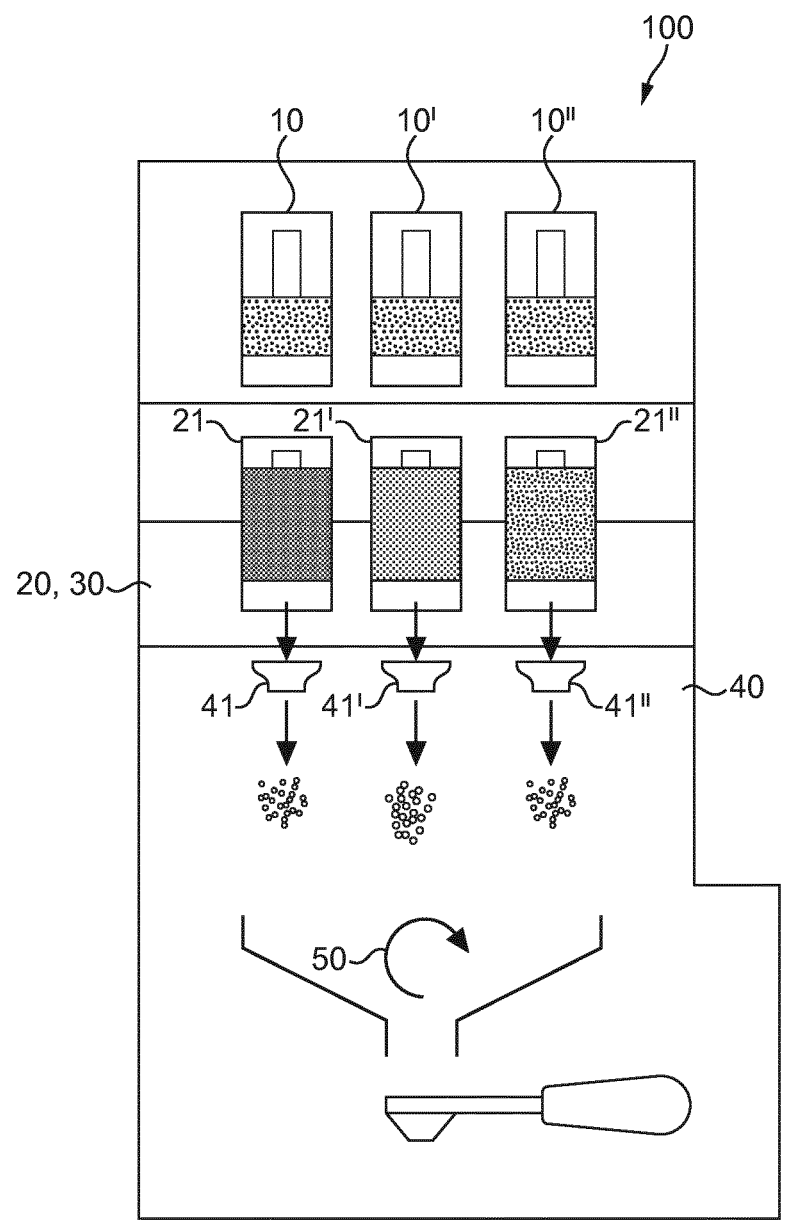
FIG. 2 shows a schematic view of a roasting and grinding system for preparing and delivering on demand roast and ground coffee, according to a second possible configuration according to the invention.

FIG. 2 shows another possible configuration of the system 100 of the invention where several roasters 21, 21', 21", etc. are provided in the roasting unit 20 (one type of roasting is possible per type of coffee bean). In this system, the roasters are also configured to keep the beans inside in correct preservation atmosphere, so no conservation area 30 is needed. Then, there is a grinding unit 41, 41', 41" per each roaster 21, 21', 21": grinded coffee is then sent into a mixing area 50 from where it is delivered or sent to the brewing unit.

Figure 3:
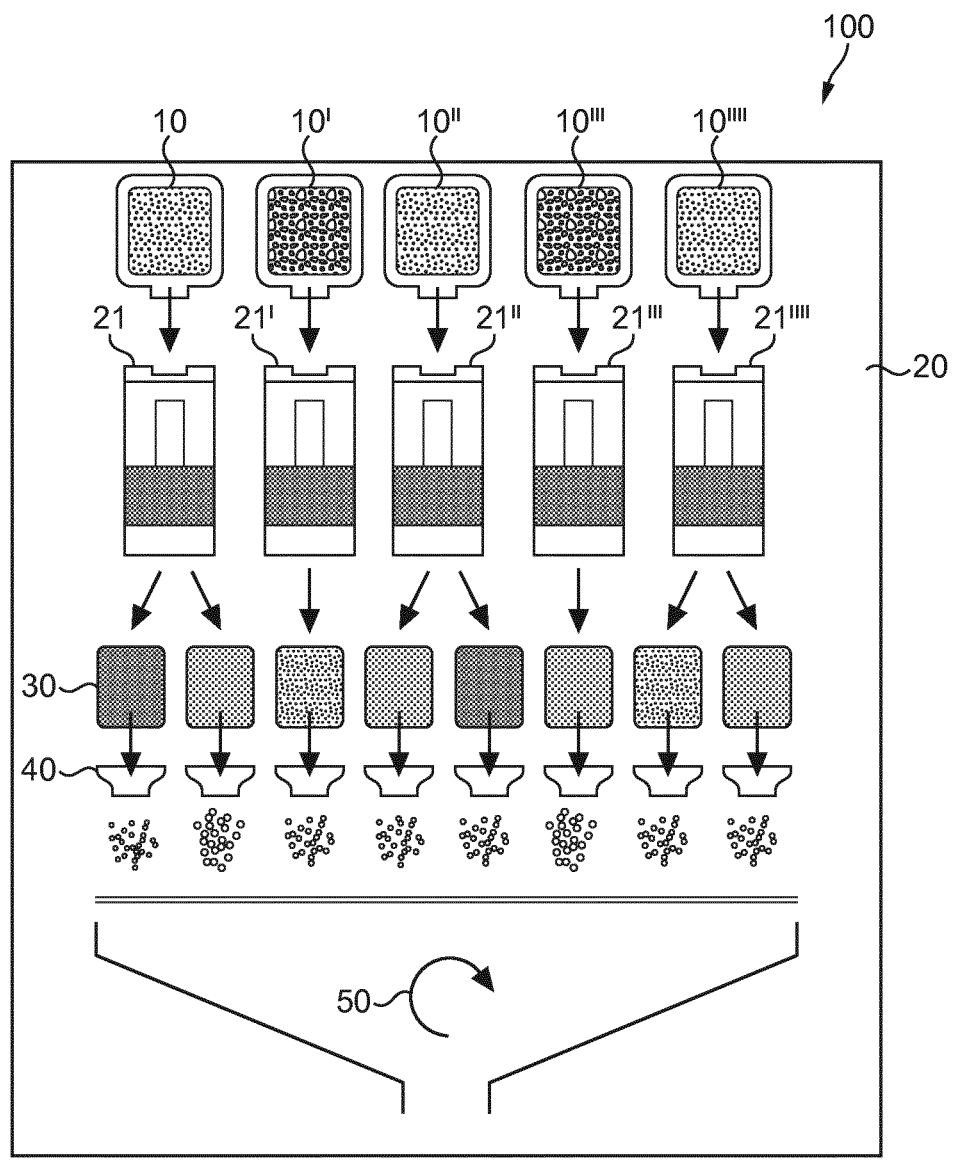
FIG. 3 shows a schematic view of a roasting and grinding system for preparing and delivering on demand roast and ground coffee, according to a third possible configuration according to the invention.

Still another possible configuration is shown in FIG. 3 attached, preferably used in factories or the like. This is a more complex configuration comprising several raw containers 10, 10', 10", etc. one per each type of coffee beans stored. A roaster 21, 21', 21", etc. is provided per each raw container, the roasters being typically very often functioning. Several conservation containers 31, 31', 31", etc., are provided to preserve in correct atmosphere the roasted coffee: grinding units 41, 41', 41", etc. are provided later, one per type of coffee grinded (i.e., one per conservation container) in order to facilitate and speed the process, from where the prepared grinded coffee goes to the mixing area 50 from where it is delivered or sent to the brewing unit to prepare the beverage.

These are only some examples of possible configurations of the system 100 of the invention: however, it should be understood that different configurations are also possible and comprised within the scope of the present invention.

According to another aspect, the invention further refers to a method for roasting and grinding coffee blends on demand using a system 100 as the one described. The method of the invention typically comprises the following steps:
   delivering a predetermined quantity of green coffee beans from one or more raw containers 10, 10', 10", etc. at a time into the roasting unit 20;
   roasting separately each quantity of green coffee beans provided according to certain roasting parameters adapted to the type of coffee roasted;
   sending each quantity of roasted coffee per type of coffee to a conservation container 31, 31', 31", etc. in the conservation area 30, where the roasted coffee is stored and preserved;
   once demanded and depending on the coffee blend requested, sending a predetermined quantity of roasted coffee from one of the conservation containers 31, 31', 31", etc. to the corresponding grinding unit 41, 41', 41", etc., where it is grinded and is further sent to the mixing area 50;
   mixing one or more grinded coffee from the conservation containers 31, 31', 31", etc., in predetermined quantities, in order to obtain a desired coffee blend or recipe.

Although the present invention has been described with reference to preferred embodiments thereof, many modifications and alterations may be made by a person having ordinary skill in the art without departing from the scope of this invention which is defined by the appended claims.

The invention claimed is:

1. A roasting and grinding system for preparing and delivering on demand roast and ground coffee, the roasting and grinding system comprising:
   one or more containers comprising green coffee beans of the same or of different types;
   a crushing unit configured to reduce the green coffee beans coming from the one or more containers to a smaller size before the green coffee beans enter a roasting unit;
   the roasting unit configured to receive the green coffee beans from the one or more containers, the roasting unit configured to automatically adapt one or more roasting parameters to the type of green coffee beans to roast, and
   the roasting unit configured to roast the green coffee beans for 15 minutes to 25 minutes at a temperature of 180° C. to 240° C. to produce roasted coffee beans; and after roasting, cool the roasted coffee beans to an ambient temperature from 2 minutes to 4 minutes in the roasting unit, to stop the roasting process;
   a conservation area configured to store the roasted coffee beans at an atmosphere in which at least one of vacuum, temperature, humidity, inert N2, or UV protection is controlled until the roasted coffee is grinded, the conservation area configured to store the roasted coffee beans from 12 hours to 7 days after the roasting;
   a grinding area comprising one or more grinding units one per type of coffee to be grinded, the one or more grinding units configured to automatically adapt one or more grinding parameters to the type of coffee or coffee mix to be grinded; and
   a mixing area configured to mix grinded coffee depending on a desired blend or recipe.

2. The roasting and grinding system according to claim 1, wherein the conservation area comprises one or more conservation containers corresponding to the one or more containers.

3. The roasting and grinding system according to claim 2, wherein the one or more grinding units correspond to the one or more conservation containers.

4. The roasting and grinding system according to claim 1, wherein the conservation area is within at least one of the one or more containers.

5. The roasting and grinding system according to claim 1, wherein each container comprises single origin or blends of green coffee beans.

6. The roasting and grinding system according to claim 1, wherein the one or more roasting parameters are selected from the group consisting of air temperature, bean temperature, time, coffee weight, humidity, pressure, gas emissions, color detection, and combinations thereof.

7. The roasting and grinding system according to claim 1 wherein the one or more grinding parameters are selected from the group consisting of grinding size, grinding time, and combinations thereof.

8. The roasting and grinding system according to claim 1, wherein the conservation area is configured to store and preserve the roasted coffee in a controlled protective atmosphere.

9. The roasting and grinding system according to claim 1 further comprising a polishing unit configured to clean the green coffee beans coming from the one or more containers before the green coffee beans enter the roasting unit.

10. The roasting and grinding system according to claim 1 further comprising a dosing unit configured to supply pre-determined dosages of the green coffee beans from the one or more containers into the roasting unit.

11. The roasting and grinding system according to claim 1 further comprising a control member configured to identify a content and/or configuration of the one or more containers and adapt the one or more roasting parameters and the one or more grinding parameters applied according to the type of coffee processed.

12. The roasting and grinding system according to claim 1 further comprising a brewing unit configured to receive the roast and ground coffee.

13. A container comprising green coffee beans in combination with a roasting and grinding system, the container detachably connectable to the roasting and grinding system for preparing and delivering on demand roast and ground coffee, the roasting and grinding system comprising:
   a crushing unit configured to reduce the green coffee beans coming from the one or more containers to a smaller size before the green coffee beans enter a roasting unit;
   the roasting unit configured to receive the green coffee beans from the container, the roasting unit configured to automatically adapt one or more roasting parameters to the type of green coffee beans to roast, and
   the roasting unit configured to roast the green coffee beans for 15 minutes to 25 minutes at a temperature of 180° C. to 240° C. to produce roasted coffee beans; and after roasting, cool the roasted coffee beans to an ambient temperature from 2 minutes to 4 minutes in the roasting unit, to stop the roasting process;
   a conservation area configured to store the roasted coffee beans at an atmosphere in which at least one of vacuum, temperature, humidity, inert N2, or UV protection is controlled until the roasted coffee is grinded, the conservation area configured to store the roasted coffee beans from 12 hours to 7 days after the roasting;
   a grinding area comprising one or more grinding units one per type of coffee to be grinded, the one or more grinding units configured to automatically adapt one or more grinding parameters to the type of coffee or coffee mix to be grinded; and
   a mixing area configured to mix grinded coffee depending on a desired blend or recipe.

14. The container according to claim 13 comprising a closing member which is in an open condition or a closed condition, wherein in the open condition, the green coffee beans are provided into the roasting unit, and in the closed condition, an exit of the container is closed, and the container can be removed/detached from the roasting and grinding system.

15. The container according to claim 13 further comprising a coupler configured to allow attaching and detaching of the container from the roasting and grinding system.

16. The container according to claim 13 further comprising an identification member with information on the type of the green coffee beans in the container, wherein the identification member is connectable to control means when the container is plugged to the roasting and grinding system.

17. The container according to claim 16 wherein the identification member comprises the one or more roasting parameters of the type of coffee contained in the container and/or the one or more grinding parameters of the type of coffee contained in the container.

18. A method for roasting and grinding coffee blends on demand using a system for preparing and delivering on demand roast and ground coffee, the system comprising;
   one or more containers comprising green coffee beans of the same or of different types;
   a roasting unit configured to receive the green coffee beans from the one or more containers, the roasting unit configured to automatically adapt one or more roasting parameters to the type of the green coffee beans to roast;
   a conservation area configured to store roasted coffee at an atmosphere in which at least one of vacuum, temperature, humidity, inert N2, or UV protection is controlled until the roasted coffee is grinded;
   a grinding area comprising one or more grinding units one per type of coffee to be grinded, the one or more grinding units configured to automatically adapt one or more grinding parameters to the type of coffee or coffee mix to be grinded; and
   a mixing area configured to mix grinded coffee depending on a desired blend or recipe,
   the method comprising:
      delivering a predetermined quantity of the green coffee beans from the one or more containers at a time into the roasting unit;
      roasting the predetermined quantity of the green coffee beans for 15 minutes to 25 minutes at temperature of 180° C. to 240° C. to produce roasted coffee beans;
      after roasting, cooling the roasted coffee beans to an ambient temperature from 2 minutes to 4 minutes in the roasting unit, to stop the roasting;
      sending the roasted coffee beans to the conservation area where the roasted coffee is stored and preserved;
      storing the cooled coffee beans in the conservation area from 12 hours to 7 days after the roasting;
      once demanded and depending on the coffee blend requested, sending a predetermined quantity of the roasted coffee beans from the conservation area to the grinding area, where the roasted coffee beans are grinded and further sent to the mixing area; and
      mixing one or more grinded coffee, in predetermined quantities, to obtain a desired coffee blend.

19. The method of claim 18, wherein the system comprises a crushing unit configured to reduce the green coffee beans coming from the one or more containers to a smaller size before the green coffee beans enter the roasting unit, and the method comprising reducing the green coffee beans coming from the one or more containers to the smaller size before the green coffee beans enter the roasting unit.

\* \* \* \* \*